Patented Oct. 27, 1953

2,657,211

UNITED STATES PATENT OFFICE 2,657,211

PREPARATION OF 1-METHYLPIPERIDYL-METHANOLS

Rolland F. Feldkamp, Troy, N. Y., assignor to Sterling Drug Inc., New York, N. Y., a corporation of Delaware No Drawing. Application September 12, 1951, Serial No. 246,339

4 Claims. (Cl. 260—294.7)

This invention relates to a process for the preparation of 1-methylpiperidylmethanols.

My new process comprises catalytically hydrogenating a lower-alkyl pyridinecarboxylate, N-methylating the resulting lower-alkyl piperidinecarboxylate by treating it with an excess of formaldehyde and catalytically hydrogenating the reaction mixture, reducing the resulting lower-alkyl 1-methylpiperidinecarboxylate by heating with sodium and a lower-alkanol, and isolating the 1-methylpiperidylmethanol thus formed.

Appropriate catalysts for the hydrogenation of the lower-alkyl pyridinecarboxylate include palladium, platinum, nickel, and copper chromite. The lower-alkyl pyridinecarboxylate is preferably dissolved or suspended in a liquid medium. Said liquid medium can be an aqueous solution of an acid such as acetic acid or can be an organic solvent not vulnerable to attack by hydrogen, such as ethanol, dioxane, ether or methylcyclohexane. The reaction is carried out in a closed vessel under elevated pressure at room temperature or above. The uptake of hydrogen can be measured by conventional methods, as by drop in pressure on the gauge, so that the completeness of hydrogenation of the pyridine nucleus is readily determined. When reduction is complete the catalyst is removed by filtration. Although the lower-alkyl piperidine-carboxylate thus formed can be isolated if desired, before proceeding with the N-methylation step, such isolation is unnecessary. A preferred embodiment comprises the use of a supported palladium catalyst such as palladium-on-charcoal in a dilute acetic acid solution for the ring reduction. The palladium-on-charcoal catalyst can be formed in situ from palladium chloride and charcoal. Hydrogenation is complete in a few hours at room temperature and an initial hydrogen pressure of about 1000 lbs. per sq. in.

The intermediate alkyl piperidinecarboxylate, which need not be isolated but can simply be separated from the spent catalyst used for the ring reduction, is then N-methylated by addition of formaldehyde and further hydrogenation in the presence of a catalyst such as nickel, platinum or palladium. A preferred catalyst is a supported palladium catalyst such as palladium-on-charcoal. The N-methylated lower-alkyl piperidinecarboxylate is produced in good yield and is easily isolated. If an acetic acid solution is the medium employed the isolation is accomplished by neutralization of the acid with a strong base, extraction and distillation of the lower-alkyl 1-methylpiperidinecarboxylate. If the same catalyst is used for the ring reduction and the N-methylation, the operations are simplified since the intermediate alkyl piperidine carboxylate need not be separated from the catalyst used for the ring reduction; formaldehyde is simply added after the ring reduction is complete and the process continued. A preferred method comprises the use of a palladium-on-charcoal catalyst for both the ring reduction and the N-methylation; enough catalyst is added initially to carry out both reactions.

The reduction of the carbalkoxy group is carried out by heating the lower-alkyl 1-methylpiperidinecarboxylate with metallic sodium and a lower alkanol. The reaction mixture is preferably diluted with an inert organic solvent such as toluene, benzene or petroleum ether in order that the reaction between the sodium and the alcohol will be retarded. Any lower-alkanol containing 1–8 carbon atoms can be used, although the lowest members, methyl and ethyl alcohol, are not to be recommended because the yields obtained are poor probably due to their relatively high reactivity towards sodium. An alcohol containing about 6 carbon atoms is preferred and 2-methylpentanol-4 has been found particularly useful. After sufficient time has been allowed for the reduction, the reaction mixture is hydrolyzed by addition of water. The desired 1-methylpiperidylmethanol then can be isolated from the organic layer and purified by distillation.

As starting materials any lower-alkyl pyridinecarboxylate can be used. The lower-alkyl group is carried through the reactions unchanged and is removed in the form of a lower-alkanol during reduction of the lower-alkyl 1-methylpiperidinecarboxylate to the 1-methylpiperidylmethanol. For practical purposes the esters employed are preferably methyl or ethyl esters.

When the starting material is an alkyl nicotinate (alkyl 3-pyridine carboxylate), 1-methyl-3-piperidylmethanol is obtained in the form of a liquid having a refractive index at 25° C. for sodium light of about 1.4765, which forms the following derivatives: hydrochloride, M. P. about 135.5–140° C.; methiodide, M. P. about 215.5–216.5° C.; and acetate methiodide, M. P. about 130–131° C.

A method has been described [Sandborn and Marvel, J. Am. Chem. Soc. 50, 563-7 (1928); Renshaw et al., ibid. 61, 638–40 (1939)] which comprises reduction of an ethyl pyridinecarboxylate with sodium in ethyl alcohol, and N-methylation with a methyl halide. This process was assumed by these investigators to give an N-methylpiperidylmethanol. For example, Sandborn and Marvel reduced ethyl nicotinate with sodium in ethyl alcohol and N-methylated the product thus obtained with methyl iodide. The authors assumed that their final product was 1-methyl-3-piperidylmethanol. However it was not the same substance as that prepared by my new process. This distinction is proved by the following facts:

Ethyl nicotinate was reduced with sodium in alcohol according to the directions of Sandborn and Marvel. The supposed 3-piperidylmethanol thus obtained was N-methylated with formaldehyde and formic acid. The resulting product, supposedly 1-methyl-3-piperidylmethanol, differed significantly in its chemical and physical properties from that prepared by way of my new process. The following table shows the respective physical properties, where the columns relate to products as follows:

I: Products prepared by sodium in alcohol reduction of ethyl nicotinate and N-methylation with formaldehyde and formic acid.
II: Reported by Sandborn and Marvel.
III: Product prepared by new process.

|  | I | II | III |
| --- | --- | --- | --- |
| Boiling point | 90–94.5° (5–6 mm.) <br> 84° (4 mm.) | 110–1127° (7 mm.) | 113–115° (17 mm.). |
| Refractive index, $n_D^{25}$ | 1.4903 <br> 1.4874 | 1.4988 | 1.4761. |
| Density |  | 1.0125 | 0.9649. |
| Melting point of diphenyl acetate hydrochloride | 169–175° C |  | 195–196° C. |
| Melting point of 4-nitro-benzoate hydrochloride |  | 187–190° C | 232.8–234.5° C. |

The product I was found to absorb bromine and to take up hydrogen in the presence of a catalyst. Catalytic hydrogenation of I produced a liquid having the refractive index, $n_D^{25}=1.4766$; this is in excellent agreement with the refractive index of product III. The diphenylacetate hydrochloride of I, M. P. 169–175° C., was also catalytically hydrogenated and a product, M. P. 195–196° C., was obtained which did not depress the melting point of the diphenylacetate hydrochloride of III, M. P. 195–196° C., upon admixture. This demonstrates that the product of Sandborn and Marvel possessed nuclear unsaturation and was not 1-methyl-3-piperidylmethanol as reported.

Further proof of the inoperativeness of the process of Sandborn and Marvel was obtained by a comparison of the melting points of derivatives of 1-methyl-3-piperidylmethanol and 1-methyl-2-piperidylmethanol, as prepared by my new synthesis, with those reported by Renshaw et al., J. Am. Chem. Soc. 61, 639 (1939), who prepared what were presumed to be 1-methyl-3-piperidylmethanol and 1-methyl-2-piperidylmethanol by the method of Sandborn and Marvel. The following table shows a distinct discrepancy in melting points.

|  | Renshaw et al. | New method |
| --- | --- | --- |
|  | M. P. ° C. | M. P. ° C. |
| 1-methyl-3-piperidylmethanol methiodide | 140.5–142 | 215.5–216.5 |
| 1-methyl-3-piperidylmethyl acetate methiodide | 134–135 | 130–131. |
| 1-methyl-2-piperidylmethanol methiodide | 275–280 (dec.) | over 300. |
| 1-methyl-2-piperidylmethyl acetate methiodide | 126.5–128.5 | 145–146. |

A number of esters of the three isomeric N-methylpiperidinemethanols have been prepared, certain individuals of which possess valuable antispasmodic properties. The esters can be prepared readily by reaction of the N-methylpiperidinemethanol with the acid halide of a carboxylic acid or with an acid anhydride. Alternatively, and in case the ester desired is derived from an acid which does not conveniently form an acid halide, the 1-methylpiperidylmethanol can be heated with the free acid in an inert solvent, preferably in the presence of an acid catalyst, with means for removing the water formed in the reaction. A convenient method of carrying out this alternative procedure involves prolonged heating of the N-methylpiperidylmethanol with the appropriate acid in benzene solution in the presence of gaseous hydrogen chloride using a water separator to remove the water from the refluxing vapors and thus shift the equilibrium in the direction of the desired ester. The volume of water formed also serves as an indicator of the extent of the reaction. This alternative procedure is especially useful when the desired ester is derived from a hydroxy acid which cannot be converted to an acid halide because of the reactive hydroxyl group, or where the acid contains a thiophene nucleus which is sensitive to acid halide-forming reagents.

The esters are conveniently isolated and characterized in the form of acid-addition salts and quaternary ammonium salts. The following table discloses a number of such esters and their melting points.

| Compound | Melting point, ° C. |
| --- | --- |
| 1. 1-methyl-2-piperidylmethyl acetate methiodide | 145–146 |
| 2. 1-methyl-3-piperidylmethyl acetate methiodide | 130–131 |
| 3. 1-methyl-3-piperidylmethyl acetate hydrochloride | 167–168.5 |
| 4. 1-methyl-3-piperidylmethyl benzoate hydrochloride | 177–178 |
| 5. 1-methyl-3-piperidylmethyl benzoate methiodide | 196.5–197 |
| 6. 1-methyl-3-piperidylmethyl nicotinate dihydrochloride monohydrate | 147–149 |
| 7. 1-methyl-3-piperidylmethyl 2-thenoate hydrochloride | 152–153 |
| 8. 1-methyl-3-piperidylmethyl benzilate hydrochloride | 217.5–220 |
| 9. 1-methyl-3-piperidylmethyl benzilate methobromide | 227.5–230 |
| 10. 1-methyl-3-piperidylmethyl phenyl-(2-thienyl)acetate hydrochloride | 174–175.5 |
| 11. 1-methyl-3-piperidylmethyl phenyl-(2-thienyl)acetate methiodide | 153.5–155 |
| 12. 1-methyl-3-piperidylmethyl 3-hydroxy-2-phenylbutanoate methiodide | 158–162 |
| 13. 1-methyl-3-piperidylmethyl 3-hydroxy-2-phenylbutanoate methobromide | 187–190 |
| 14. 1-methyl-4-piperidylmethyl acetate methiodide | 149.5–151.5 |

Compounds Nos. 10 and 11 are described and claimed in my prior application, Serial No. 124,489, filed October 29, 1949, now U. S. Patent 2,533,002.

Compounds Nos. 12 and 13 are described and claimed in my prior application, Serial No. 124,490, filed October 29, 1949, now U. S. Patent 2,533,003.

The following examples will further illustrate my invention.

EXAMPLE 1

(a) *Ethyl 1-methylpiperidine-3-carboxylate.*—Ethyl nicotinate (453.5 g., 3 moles) was suspended in 500 cc. of water and treated with 343 cc. (6 moles) of glacial acetic acid. The solution was diluted to 1500 cc. with water and placed in a rocking bomb hydrogenator with 7.5 g. of Adams platinum oxide catalyst. Slightly over the theoretical amount of hydrogen was absorbed in four hours at room temperature. The initial pressure of hydrogen was 1200 lbs. per sq. in., and the pressure gradually dropped to 200 lbs. per sq. in. at the end of the hydrogenation. The catalyst was removed by filtration and the filtrate returned to the hydrogenator with 300 cc. of 36% formaldehyde (3.6 moles) and 30 g. of 10% palladium catalyst freshly prepared from 3 g. of palladium chloride and 27 g. of activated charcoal. Absorption of hydrogen proceeded very rapidly at room temperature and was complete within two hours. The catalyst was removed by filtration through a Büchner funnel. The clear filtrate was cooled to 15° C. and slowly treated with 300 g. of potassium hydroxide pellets and 300 cc. of 40% potassium hydroxide solution. The liberated basic ester was extracted with ether and the combined extract dried over anhydrous magnesium sulfate. After filtration and removal of solvent, the residual oil was distilled under reduced pressure, giving 389.7 g. of ethyl 1-methylpiperidine-3-carboxylate, B. P. 98–99.5° C. at 17–18 mm. (76%); $n_D^{25}$=1.4474.

(b) *1-methyl-3-piperidylmethanol.* — Freshly cut sodium metal (214.5 g., 9.33 moles) was placed in a 5 liter flask fitted with a stirrer, dropping funnel, condenser, and calcium chloride tube. The sodium was covered with a sufficient part of 1900 cc. of dry toluene and the mixture heated to refluxing. The molten sodium and toluene were efficiently stirred and heated at a low reflux rate while a solution of 389.7 g. (2.215 moles) of ethyl 1-methylpiperidine-3-carboxylate in 482 g. (4.66 moles) of 2-methylpentanol-4 and the remaining toluene was added slowly. The addition was made over a period of four hours with just sufficient external heating to maintain refluxing. When the addition was complete, the reaction mixture was stirred and refluxed for one-half hour longer and then allowed to cool to about 80° C. A small amount of dispersed sodium was disregarded and the mixture slowly hydrolyzed with 600 cc. of water. Care should be taken to prevent overheating and excessive foaming during this process. The warm hydrolysis mixture was immediately transferred to a separatory funnel, the toluene layer removed and the aqueous layer further extracted with the same solvent. The combined extract was dried over anhydrous magnesium sulfate. After filtration the toluene was removed by distillation at atmospheric pressure, and the 2-methylpentanol-4 was distilled off at partially reduced pressure. The residual oil distilled at 112–114° C. at 15 mm. pressure, giving 237.1 g. of 1-methyl-3-piperidylmethanol as a straw-colored oil; $n_D^{25}$=1.4752 (82.8%).

A sample of 1-methyl-3-piperidylmethanol was converted to its hydrochloride by the action of dry hydrogen chloride on an anhydrous ether solution of the basic alcohol. The hydrochloride had the m. p. 135.5–140° C., and when converted back to the free basic alcohol by the addition of alkali gave a sample of 1-methyl-3-piperidylmethanol having $n_D^{25}$=1.4765.

*Anal.*—Calcd. for $C_7H_{15}NO$: C, 65.0; H, 11.70; N, 10.82. Found: C, 64.74; H, 11.48; N. 10.90.

(c) *Methiodide of 1-methyl-3-piperidylmethanol.*—A solution of 2.58 g. of 1-methyl-3-piperidylmethanol and 5.67 g. of methyl iodide in 25 cc. of anhydrous ethyl alcohol was warmed for several hours on a steam bath. Upon cooling, a precipitate formed which was collected by filtration giving 5.5 g. of solid, M. P. 204–208° C. (dec.). Recrystallization of this material from ethyl alcohol gave 4.5 g. of the methiodide of 1-methyl-3-piperidylmethanol, M. P. 215.5–216.5° C.

*Anal.*—Calcd. for $C_8H_{18}INO$: C, 35.43; H, 6.69; I, 46.81. Found: C, 35.31; H, 6.56; I, 46.80.
35.45     6.48

(d) *1-methyl-3-piperidylmethyl acetate methiodide.*—A mixture of 17.4 g. of 1-methyl-3-piperidylmethanol methiodide and 61 g. of acetic anhydride was refluxed for one-half hour. The excess acetic anhydride was removed in vacuo and the crystalline residue was stirred with an ether-ethanol mixture. The solid was collected by filtration and amounted to 19.6 g. (91%), M. P. 110–120° C. Recrystallization of this solid from an ether-ethanol mixture gave a sample of 1-methyl - 3 - piperidylmethyl acetate methiodide, M. P. 130–131° C.

*Anal.*—Calcd. for $C_{10}H_{20}INO_2$: C, 38.35; H, 6.44; I, 40.53. Found: C, 38.58; H, 6.56; I, 40.35.

EXAMPLE 2

(a) *Ethyl 1 - methylpiperidine-4-carboxylate* was prepared by a method similar to that described in Example 1, part (a). Ethyl pyridine-4-carboxylate (44.85 g.) was hydrogenated using 0.75 g. of Adams platinum oxide catalyst in 34 cc. of glacial acetic acid and 150 cc. of water. The intermediate ethyl piperidyl-4-carboxylate, not isolated, was reacted with 30 cc. of formaldehyde in the presence of hydrogen and palladium-on-charcoal catalyst (prepared from 0.3 g. of palladium chloride and 0.3 g. of charcoal). The product, prepared by neutralization of the reaction mixture with 80 cc. of 40% potassium hydroxide solution and extraction, was distilled in vacuo to give 38.8 g. (76%) of ethyl 1-methylpiperidine-4-carboxylate, B. P. 94° C. (12 mm.); $n_D^{25}$=1.4470.

(b) *1-methyl-4-piperidlymethanol* was prepared by a method similar to that described in Example 1, part (b) from the reaction of 38.8 g. of ethyl 1-methylpiperidine-4-carboxylate, 20.9 g. of sodium and 46.8 g. of 2-methylpentanol-4 in 180 cc. of toluene. The product was distilled in vacuo to give 25.6 g. (87%) of 1-methyl-4-piperidylmethanol, B. P. 110–111° C. (10 mm.); $n_D^{25}$=1.4737. A redistillation gave 18.3 g. of 1-methyl-4-piperidylmethanol, B. P. 116° C. (16 mm.); $n_D^{25}$=1.4750.

*Anal.*—Calcd. for $C_7H_{15}NO$: N, 10.82. Found: N, 10.73.

The hydrochloride of 1-methyl-4-piperidylmethanol formed by neutralization of the base with hydrochloric acid had the M. P. 143.5–145.5° C. after recrystallization from alcohol.

(c) *Methiodide of 1-methyl-4-piperidylmethanol.*—A solution of 3.88 g. of 1-methyl-4-piperidylmethanol and 5.78 g. of methyliodide in 50 cc. of anhydrous ethyl alcohol was warmed for several hours on a steam bath. Upon cooling, a precipitate formed which was collected by filtration giving 5.5 g. (67%) of the methiodide of 1-methyl-4-piperidylmethanol, M. P. 204.5–205.5° C.

*Anal.*—Calcd. for $C_8H_{18}INO$: C, 35.43; H. 6.69; I, 46.81. Found: C, 35.55; H, 6.59; I, 46.60.

(d) *1-methyl-4-piperidylmethyl acetate methiodide.*—A mixture of 6.5 g. of 1-methyl-4-piperidylmethanol methiodide and 24.5 g. of acetic anhydride was refluxed for one-half hour. The excess acetic anhydride was removed in vacuo and the crystalline residue was stirred with an ether-ethanol mixture. The solid was cooled by filtration and amounted to 5.9 g., M. P. 150.5–151.5° C. Recrystallization of this solid from an ether-ethanol mixture gave a sample of 1-methyl-4-piperidylmethyl acetate methiodide, M. P. 149.5–151.5° C.

*Anal.*—Calcd. for $C_{10}H_{20}INO_2$: C, 38.35; H, 6.44; I, 40.53. Found: C, 38.30; H, 6.36; I, 40.30.

EXAMPLE 3

(a) *Ethyl 1-methylpiperidine-2-carboxylate* was prepared by a method similar to that described in Example 1, part (a). Ethyl pyridine-2-carboxylate (38.7 g.) was hydrogenated using 0.75 g. of Adams platinum oxide catalyst in 29.4 cc. of glacial acetic acid and 150 cc. of water. The intermediate ethyl piperidine-2-carboxylate, not isolated, was reacted with 26 cc. of formaldehyde in the presence of hydrogen at 50 lbs. pressure and palladium-on-charcoal catalyst (prepared from 0.26 g. of palladium chloride and 0.26 g. of charcoal). The product, prepared by neutralization of the reaction mixture with 72.5 cc. of 40% potassium hydroxide solution and extraction, was distilled in vacuo to give 36.7 g. (83%) of ethyl 1-methylpiperidine-2-carboxylate, B. P. 90–95° C. (16 mm.); $n_D^{25}=1.4487$.

*Anal.*—Calcd. for $C_9H_{17}NO_2$: N, 8.21. Found: N, 8.20.

(b) *1-methyl-2-piperidylmethanol* was prepared by a method similar to that described in Example 1, part (b) from the reaction of 32 g. of ethyl 1-methylpiperidine-2-carboxylate, 17.2 g. of sodium and 38.7 g. of 2-methylpentanol-4 in 175 cc. of toluene. The product was distilled in vacuo to give 22.7 g. of liquid with $n_D^{25}=1.4717$. A redistillation gave 9.9 g. of 1-methyl-2-piperidylmethanol, B. P. 90–92° C. (15 mm.);

$$n_D^{25}=1.4748$$

*Anal.*—Calcd. for $C_7H_{15}NO$: C, 65.0; H, 11.70; N, 10.82. Found: C, 64.71; H, 11.79; N, 10.83.

The hydrochloride of 1-methyl-2-piperidylmethanol formed by neutralization of the base with hydrochloric acid was very hygroscopic and no product with a definite melting point could be obtained.

(c) *Methiodide of 1-methyl-2-piperidylmethanol.*—A solution of 3.88 g. of 1-methyl-2-piperidylmethanol and 5.78 g. of methyl iodide in 50 cc. of anhydrous ethyl alcohol was warmed for several hours on a steam bath. The methiodide of 1-methyl-2-piperidylmethanol isolated from this reaction was recrystallized from alcohol and had a M. P. above 300° C.

*Anal.*—Calcd. for $C_8H_{18}INO$: C, 35.43; H, 6.69; I, 46.81. Found: C, 35.46; H, 6.71; I, 46.45.

(d) *1-methyl-2-piperidylmethyl acetate methiodide.*—A mixture of 6.7 g. of 1-methyl-2-piperidylmethanol methiodide and 25.4 g. of acetic anhydride was refluxed for one-half hour. The excess acetic anhydride was removed in vacuo and the crystalline residue was stirred with an ether-ethanol mixture. The solid was collected by filtration and amounted to 7.9 g., M. P. 120–123° C. Recrystallization of the solid from an ether-ethanol mixture gave a sample of 1-methyl-2-piperidylmethyl acetate methiodide, M. P. 145–146.5° C.

*Anal.*—Calcd. for $C_{10}H_{20}INO_2$: C, 38.35; H, 6.44; I, 40.53. Found: C, 38.33; H, 6.32; I, 40.15.

EXAMPLE 4

Nicotinic acid (123.1 g.) was added over a period of fifteen minutes to 580 ml. of thionyl chloride with stirring. The mixture was refluxed for four hours, concentrated in vacuo (33° C., 120 mm.), and 300 ml. of absolute alcohol was added dropwise over a period of fifty minutes. The solution was refluxed for thirty minutes, concentrated in vacuo, and the residue (205 g. containing ethyl nicotinate) was dissolved in 150 ml. of hot water and stirred with 15 g. of activated charcoal to decolorize the solution. The solution was filtered and to the filtrate were added 149.6 g. of sodium acetate, 220 ml. of acetic acid, 30 g. of charcoal and 2.3 g. of palladium chloride, and the mixture was shaken in a rocking-bomb hydrogenator at room temperature in an atmosphere of hydrogen at 1000 lbs. per sq. in. pressure. Hydrogenation was complete in eight hours. The hydrogenator was opened, 100 ml. of formaldehyde was added, and the mixture was again shaken for one and one-half hours under hydrogen at 725 lbs. per sq. in. The mixture was then filtered through a filter aid, the filtrate was cooled to 10° C. and neutralized with stirring with 435 ml. of 35% sodium hydroxide solution. The mixture was extracted several times with ether, the ether solution was dried over anhydrous calcium sulfate and concentrated. The residue was distilled and the fraction boiling at 68° C. (0.1 mm.) was collected, giving 126.5 g. of ethyl 1-methylpiperidine-3-carboxylate, refractive index $n_D^{26.8}=1.4468$.

EXAMPLE 5

A mixture of 151.2 g. of ethyl nicotinate, 115 ml. of glacial acetic acid, 167 ml. of water, 2.3 g. of palladium chloride and 30 g. of charcoal was shaken for fifteen hours in a rocking-bomb hydrogenator at room temperature under hydrogen at 1000 lbs. per sq. in. The hydrogenator was then opened, 100 ml. of 36% formaldehyde was added and the mixture was shaken for one and one-half hours under hydrogen at 750 lbs. per sq. in. The mixture was filtered through a filter aid, the filtrate was saturated with 500 g. of sodium chloride, covered with 300 ml. of ether, cooled to 0° C., and 170 ml. of 38% sodium hydroxide was added. The ether layer was separated and the aqueous layer further extracted with ether. The combined ether extracts were dried over anhydrous calcium sulfate and concentrated. The residue was distilled in vacuo and the fraction boiling at 75° C. (0.5 mm.) was collected, giving 150.5 g. of ethyl 1-methylpiperidine-3-carboxylate, refractive index $$n_D^{28.5}=1.4468$$

This application is a continuation-in-part of my copending application, Serial No. 122,366 filed October 19, 1949, now abandoned.

I claim:

1. The process for preparing a 1-methylpiperidylmethanol which comprises catalytically hydrogenating a lower-alkyl pyridinecarboxylate using a catalyst selected from the group consisting of palladium, platinum, nickel and copper chromite, treating the resulting lower-alkyl piperidinecarboxylate with an excess of formaldehyde in the presence of hydrogen and a catalyst selected from the group consisting of palladium, platinum and nickel, heating the resulting lower-alkyl 1-methylpiperidinecarboxylate with sodium and a lower-alkanol having from 3–8 carbon atoms, and isolating the resulting 1-methylpiperidylmethanol.

2. The process for preparing a 1-methylpiperidylmethanol which comprises catalytically hydrogenating a lower-alkyl pyridinecarboxylate using a palladium catalyst, treating the resulting lower-alkyl piperidinecarboxylate with an excess of formaldehyde in the presence of hydrogen and a palladium catalyst, heating the resulting lower-alkyl 1-methylpiperidinecarboxylate with sodium and a lower-alkanol having from 3–8 carbon atoms, and isolating the resulting 1-methylpiperidylmethanol.

3. The process for preparing a 1-methylpiperidylmethanol which comprises catalytically hydrogenating a lower-alkyl pyridinecarboxylate using a palladium catalyst, treating the resulting lower-alkyl piperidinecarboxylate with an excess of formaldehyde in the presence of hydrogen and a palladium catalyst, heating the resulting lower-alkyl 1-methylpiperidinecarboxylate with sodium and 2-methylpentanol-4, and isolating the resulting 1-methylpiperidylmethanol.

4. The process for preparing 1-methyl-3-piperidylmethanol which comprises catalytically hydrogenating a lower-alkyl nicotinate with a palladium catalyst, treating the resulting lower-alkyl 3-piperidinecarboxylate with an excess of formaldehyde in the presence of hydrogen and a palladium catalyst, heating the resulting lower-alkyl 1-methyl-3-piperidinecarboxylate with sodium and 2-methylpentanol-4, and isolating the resulting 1-methyl-3-piperidylmethanol.

ROLLAND F. FELDKAMP.

References Cited in the file of this patent

UNITED STATES PATENTS

| Number | Name | Date |
|---|---|---|
| 1,659,666 | Schirmacher et al. | Dec. 18, 1928 |
| 2,229,523 | Walters et al. | Jan. 21, 1941 |
| 2,477,937 | Paul et al. | Aug. 2, 1949 |
| 2,533,002 | Feldkamp | Dec. 5, 1950 |
| 2,533,003 | Feldkamp | Dec. 5, 1950 |

FOREIGN PATENTS

| Number | Country | Date |
|---|---|---|
| 441,122 | Great Britain | of 1936 |
| 717,712 | France | Jan. 13, 1932 |

OTHER REFERENCES

Marvel et al., Jour. Amer. Chem. Soc., vol. 51, pp. 915–917 (1929).

Ford-Moore, Jour. Chem. Soc. (London) pp. 55–60 (1947).

Lands, Jour. Pharm. and Exp. Thera., vol. 102, #4, pp. 222, 227 (1951).

Sandborn et al., Jour. Amer. Chem. Soc., vol. 50, pp. 563–567 (1928).

Sauer et al., Chem. Abst., vol. 32 (1938) pp. 2532–2533.